United States Patent
Dodson

(10) Patent No.: US 6,513,159 B1
(45) Date of Patent: Jan. 28, 2003

(54) PLATFORM INTELLIGENT INSTALLER

(75) Inventor: Tom Dodson, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/537,972

(22) Filed: Mar. 28, 2000

(51) Int. Cl.[7] .............................................. G06F 9/445
(52) U.S. Cl. ...................................... 717/178; 713/100
(58) Field of Search .......................... 717/11, 168, 170, 717/171, 172, 173, 174, 176, 177, 178; 710/72; 709/321; 713/200, 1, 2, 100

(56) References Cited

U.S. PATENT DOCUMENTS

| | | | | |
|---|---|---|---|---|
| 5,459,867 A | * | 10/1995 | Adams et al. ............... | 709/321 |
| 5,802,365 A | * | 9/1998 | Kathail et al. .............. | 709/321 |
| 5,870,610 A | * | 2/1999 | Beyda ........................... | 713/1 |
| 5,960,204 A | * | 9/1999 | Yinger et al. ................. | 717/11 |
| 5,974,474 A | * | 10/1999 | Furner et al. ................. | 710/8 |
| 6,009,274 A | * | 12/1999 | Fletcher et al. .............. | 717/11 |
| 6,009,524 A | * | 12/1999 | Olarig et al. ................ | 713/200 |
| 6,279,155 B1 | * | 8/2001 | Amberg et al. .............. | 717/11 |

* cited by examiner

Primary Examiner—Kakali Chaki
Assistant Examiner—Chuck Kendall
(74) Attorney, Agent, or Firm—Marger Johnson & McCollom, P.C.

(57) ABSTRACT

An automatic installation program runs on a computer. The automatic installation program includes a system evaluator and a driver evaluator. The system evaluator evaluates the hardware configuration of the computer. The driver evaluator determines the drivers installed on the computer. The installation program assembles a stack from the hardware configuration, and compares the stack with a valid package matrix. If a match is found, the installation program then compares the drivers in the matched stack with the drivers installed on the computer to determine which drivers need to be installed and which drivers need to be updated. The installation program connects to a driver source location, and installs and updates the drivers as needed.

30 Claims, 11 Drawing Sheets

PLATFORM INTELLIGENT INSTALLER

FIELD OF THE INVENTION

This invention pertains to the installation of drivers for a computer system, and more particularly to automating driver installation.

BACKGROUND OF THE INVENTION

When a user adds a new hardware peripheral or new software (called a device below) to a computer, the computer needs to know how to use the new device. Typically, this is done with a driver. Drivers interface between an operating system and the device, and instruct the device how to perform the tasks requested by the operating system. This eliminates the need for the operating system to know how to communicate with every possible device. The operating system simply sends the instruction to the driver in a standardized format, and the driver translates the instruction into a format understood by the device. For example, in the case of a graphics adapter, the operating system sends the instructions to display an image. It is the driver's responsibility to send commands to the graphics adapter to display the image in a language the graphics adapter understands.

But with the number of devices constantly growing, the number of combinations of devices (and thus of drivers) is increasing exponentially. Without testing every combination of drivers, it is impossible to be certain that a particular combination of drivers will inter-operate properly. This combinatorics problem is further compounded by the fact that suppliers continually update their drivers. There may be, for example, five different versions of a driver for a particular model of a particular device, each version of the driver introducing new features over the last. Even if two drivers inter-operate properly, there is no guarantee that new versions will continue to inter-operate properly.

In the past, the responsibility for testing combinations of drivers lay with the user. If a particular combination of drivers did not inter-operate properly, it was the user's responsibility to determine the problem and correct it, for example, by changing the settings of the driver or its associated device. This process took a lot of time, as users would have to experiment to determine where the problem lay. The process could also be frustrating, as the problem occasionally could not even be corrected by changing a setting, and the user would be forced to exclude one of the desired devices. Further, the user would have to undertake this process every time he or she wanted to update to newer versions of installed drivers. Even if the older drivers had inter-operated properly, the user would still have to cross his or her fingers and hope that the new drivers would work as well. Upgrading to a newer version of the Basic Input/Output Software (BIOS) could be even more problematic: the computer might fail to boot up at all, making it impossible to revert to the older version of the BIOS.

The present invention addresses this and other problems associated with the prior art.

DETAILED DESCRIPTION OF THE PREFERRED EMBODIMENT

Figure 1:
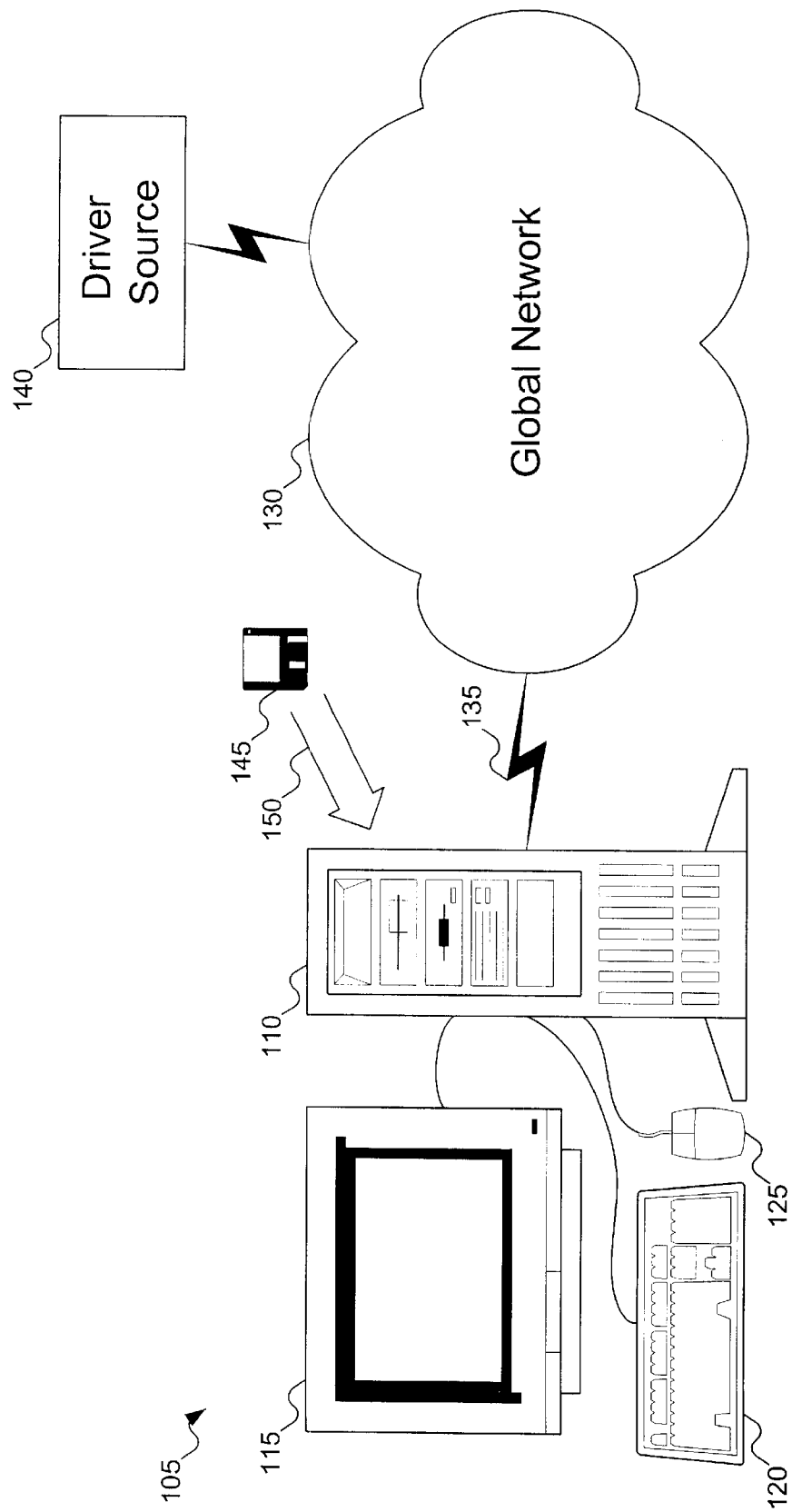
FIG. 1 shows a computer system coupled to a network on which the invention can operate.

FIG. 1 shows a computer system 105 in accordance with a preferred embodiment of the invention. Computer system 105 includes a computer 110, a monitor 115, a keyboard 120, and a mouse 125. Computer 110 includes a central processing unit and memory (not shown). Computer system 105 can also include other equipment not shown in FIG. 1, for example, other input/output equipment or a printer.

In the preferred embodiment, computer system 105 is connected to a global network 130 via a network connection 135. However, a person skilled in the art will recognize that global network 130 and network connection 135 can vary as required by the situation. For example, instead of being a global internetwork, global network 130 can be just a local intranet. Similarly, network connection 135 can be an Ethernet connection or a dial-up connection activated by a modem connected to computer system 105.

Connected to global network 130 is driver source 140. Driver source 140 includes the drivers to be installed or updated in computer system 105. In the preferred embodiment, driver source 140 is a web site that is best accessed through global network 130. However, a person skilled in the art will recognize that there are other ways to obtain drivers from driver source 140. For example, driver source 140 may be a bulletin board that can be accessed by dialing a specific telephone number with a modem connected to computer system 105. Alternatively, driver source 140 may be a computer-readable medium 145, such as a diskette or compact disc, which is inserted in an appropriate drive in computer 110, as shown by arrow 150.

Figure 2:
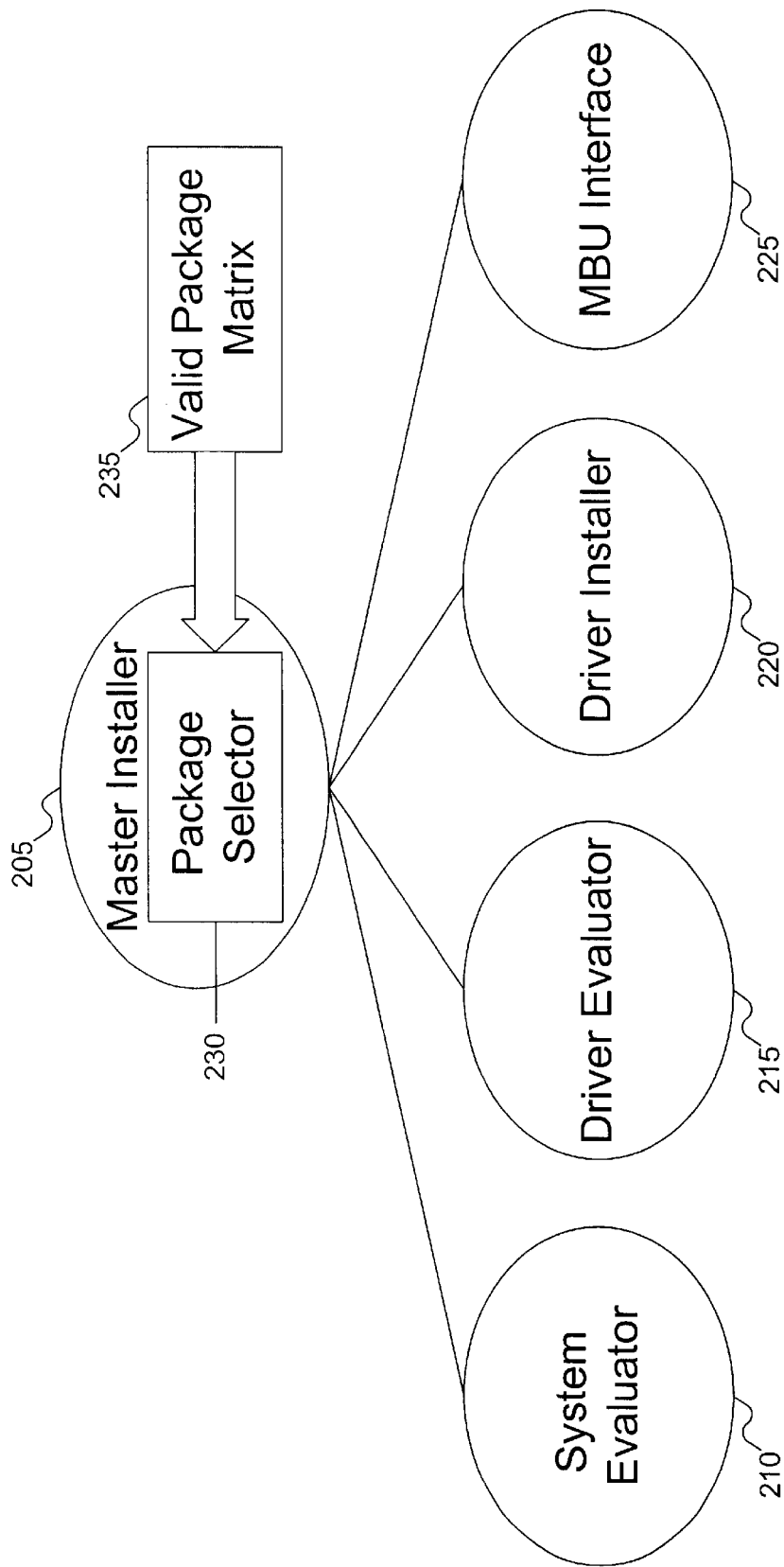
FIG. 2 shows the components of an installation program according to the preferred embodiment.

FIG. 2 shows the components of an installation program according to the preferred embodiment. Master installer 205 includes three components: system evaluator 210, driver evaluator 215, and driver installer 220. System evaluator 210 is responsible for determining the installed hardware of computer system 105. Driver evaluator 215 is responsible for determining what drivers are installed in computer system 105, and what versions of those drivers are installed. Driver installer 220 is responsible for installing new drivers and updating existing drivers selected by master installer 205 that are obtained from driver source 140.

In the preferred embodiment, master installer 205 calls system evaluator 210 and driver evaluator 215 individually for each possible installed hardware peripheral and driver. System evaluator 210 and driver evaluator 215 then query computer system 105 for only one hardware peripheral or driver at a time. However, a person skilled in the art will recognize that master installer 205 can call these components only once, and let the components make as many queries as are necessary to locate all installed hardware peripherals and drivers.

Master installer 205 also includes Modular Basic Input/Output Software (BIOS) Update (MBU) interface 225. MBU interface 225 is responsible for determining the version of the BIOS currently installed in computer system 105, obtaining a new BIOS image block from a BIOS source (in the preferred embodiment, the BIOS source is driver source 140), authenticating the new image block, and installing the new BIOS image. MBU interface 225 is also responsible for accessing the BIOS of computer system 105 to determine features of computer system 105: for example, the platform configuration of computer system 105 and its version (see below with reference to FIG. 7 for more information).

Master installer 205 includes a package selector 230. Package selector 230 is responsible for selecting the drivers that need to be installed or updated on computer system 105. Package selector 230 begins by receiving valid package matrix 235, which contains all known validated driver stacks. A stack is a combination of drivers that is known to inter-operate properly. Each stack also includes identifiers for the hardware components that are supported by the drivers in the stack. For any given driver, there can be many different models or brands of hardware supported by that driver. Thus, for example, if keyboard driver D1 supports keyboards K1 and K2, and mouse driver D2 supports mice M1, M2, and M3, and keyboard driver D1 and mouse driver D2 form a valid stack, the stack would be represented as follows:

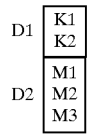

Once package selector 230 has received valid package matrix 235, package selector 230 compares the known hardware installed on the system with the valid stacks in valid package matrix 235. When a valid stack in valid package matrix 235 is found, the drivers that should be installed are determined from that stack.

Figure 3:
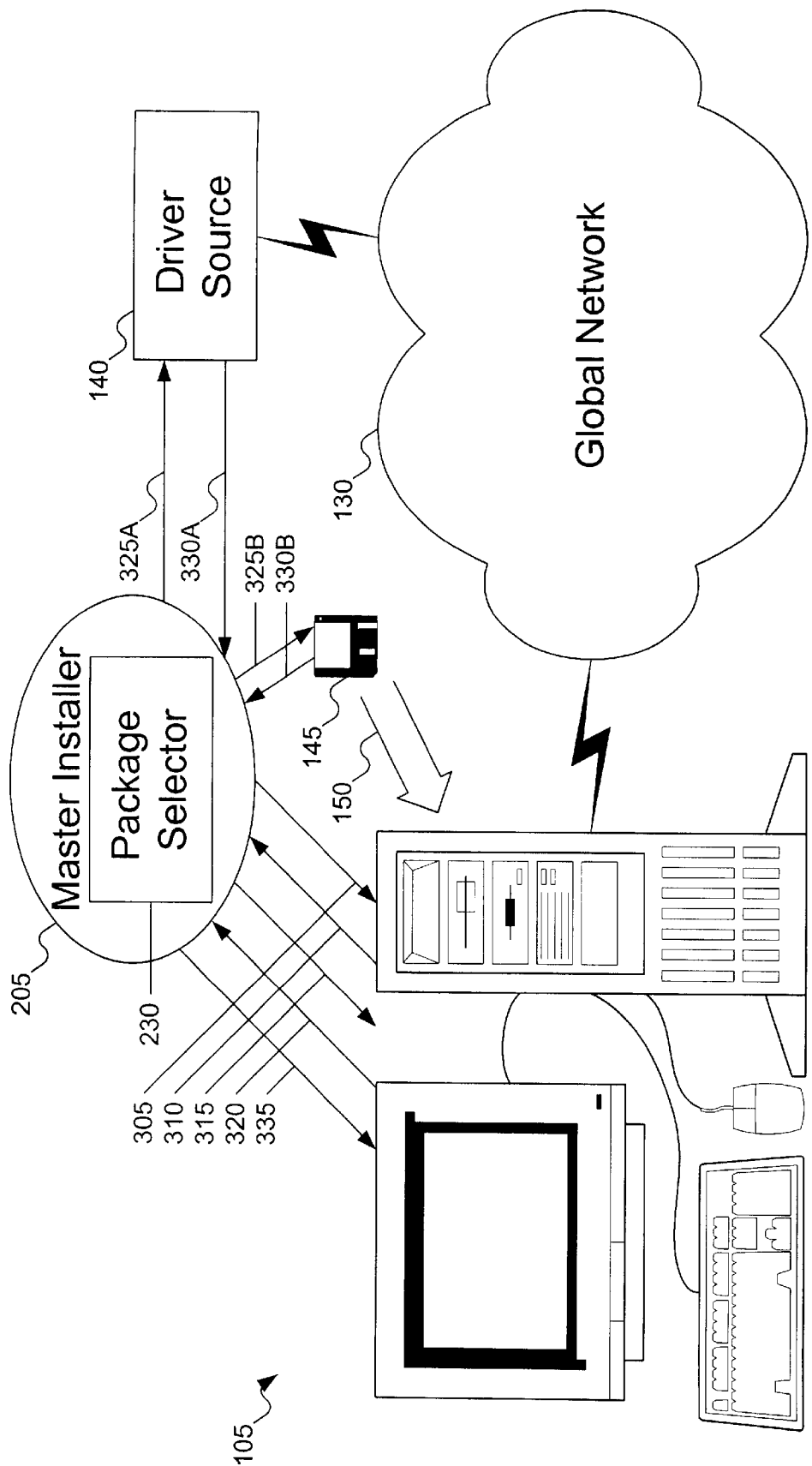
FIG. 3 shows the interaction between the installation program of FIG. 2 and the computer system of FIG. 1.

FIG. 3 shows the interaction between the installation program of FIG. 2 and the computer system of FIG. 1. In FIG. 3, master installer 205 begins by querying computer system 105 for known hardware (shown by arrow 305). In the preferred embodiment, this is done by system evaluator 210 (not shown in FIG. 3), which queries the known addresses for individual hardware peripherals and determines what hardware peripherals are attached. The results are returned as shown by arrow 310. Master installer 205 also queries computer system 105 for installed drivers and their versions (shown by arrow 315). In the preferred embodiment, this is done by driver evaluator 215 (not shown in FIG. 3). The results are returned as shown by arrow 320. Package selected 230 then assembles the hardware stack based on the results returned by system evaluator 210, and compares this hardware stack with valid package stack 235 (not shown in FIG. 3). Once a validated stack is selected, master installer 205 compares the results returned by driver evaluator 215 to determine which drivers need to be installed or updated. Master installer 205 then requests the required drivers from driver source 140 (shown by arrow 325A for driver source 140 as a web site accessed over global network 130, and by arrow 325B for driver source 140 as a computer-readable medium 145 inserted into the appropriate drive in computer 110). Once master installer 205 receives the required drivers from driver source 140 (shown by arrows 330A and 330B for driver source 140 as a web site and computer-readable medium, respectively), master installer 205 installs the required drivers in computer system 105 (as shown by arrow 335).

Figure 4:
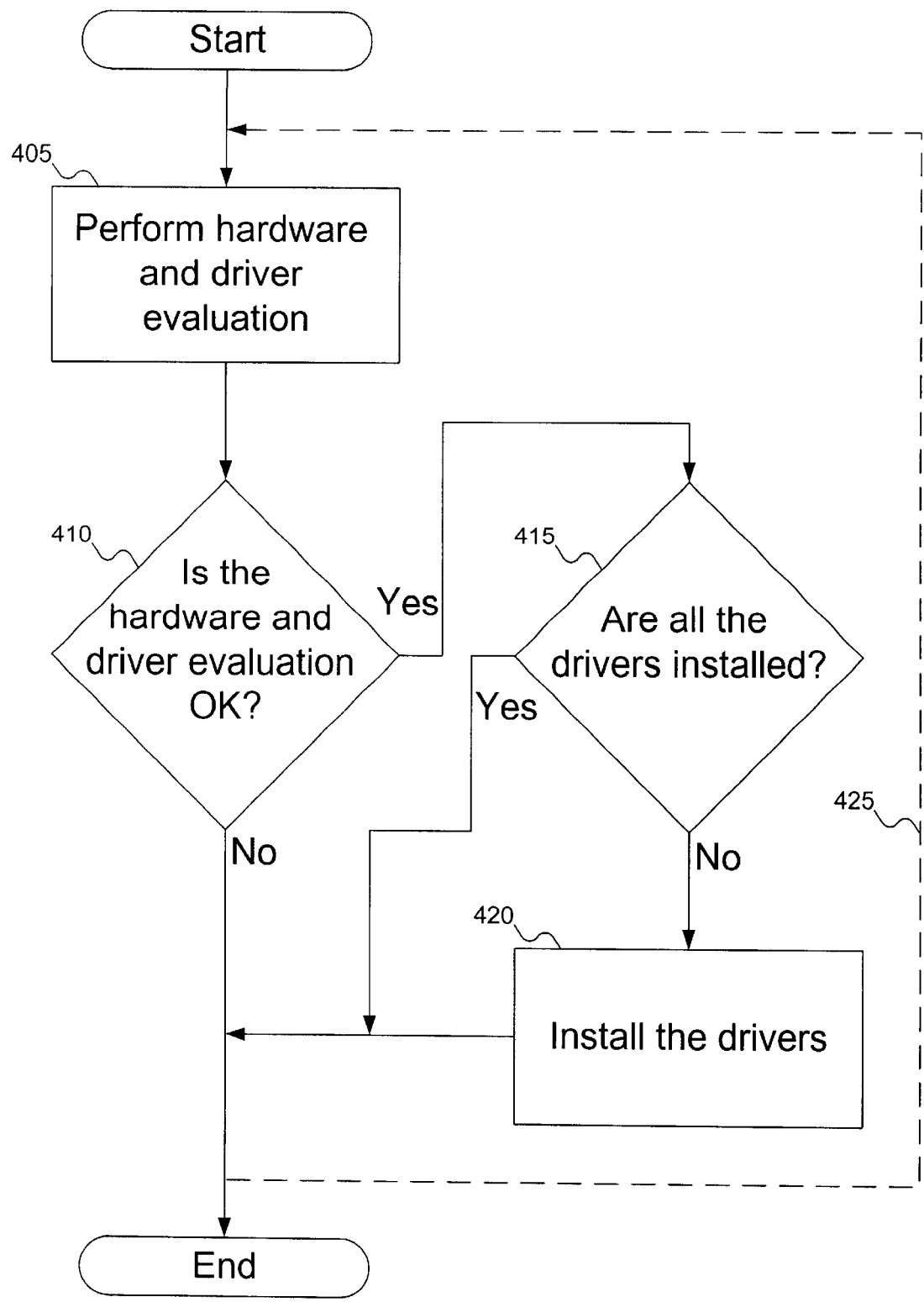
FIG. 4 is a flowchart showing the overall operation of the installation program of FIG. 2.

FIG. 4 is a flowchart showing the overall operation of the installation program of FIG. 2. In FIG. 4, at block 405, the master installer checks the hardware and driver evaluation. At decision point 410, the user is presented with the results of the hardware and driver evaluation. This allows the user to prevent the driver installation from happening if the user feels that the hardware and driver evaluation is incorrect. If the user approves the installation, then at decision point 415 the master installer checks to see if all the drivers in the stack are installed. If some required drivers are not installed, then at block 420 the missing drivers are installed.

The overall operation can also be repeated, as shown by dashed line 425. For example, the computer system can be configured to run the installation operation every time the computer is restarted. Or the user can be presented with the option of running the installation program on a recurring basis: for example, once a day. Running the installation operation periodically will identify any newly added hardware or software and install drivers for the new device. Running the installation operation on a regular basis also enables checking for updates to the existing driver base.

Figure 5:
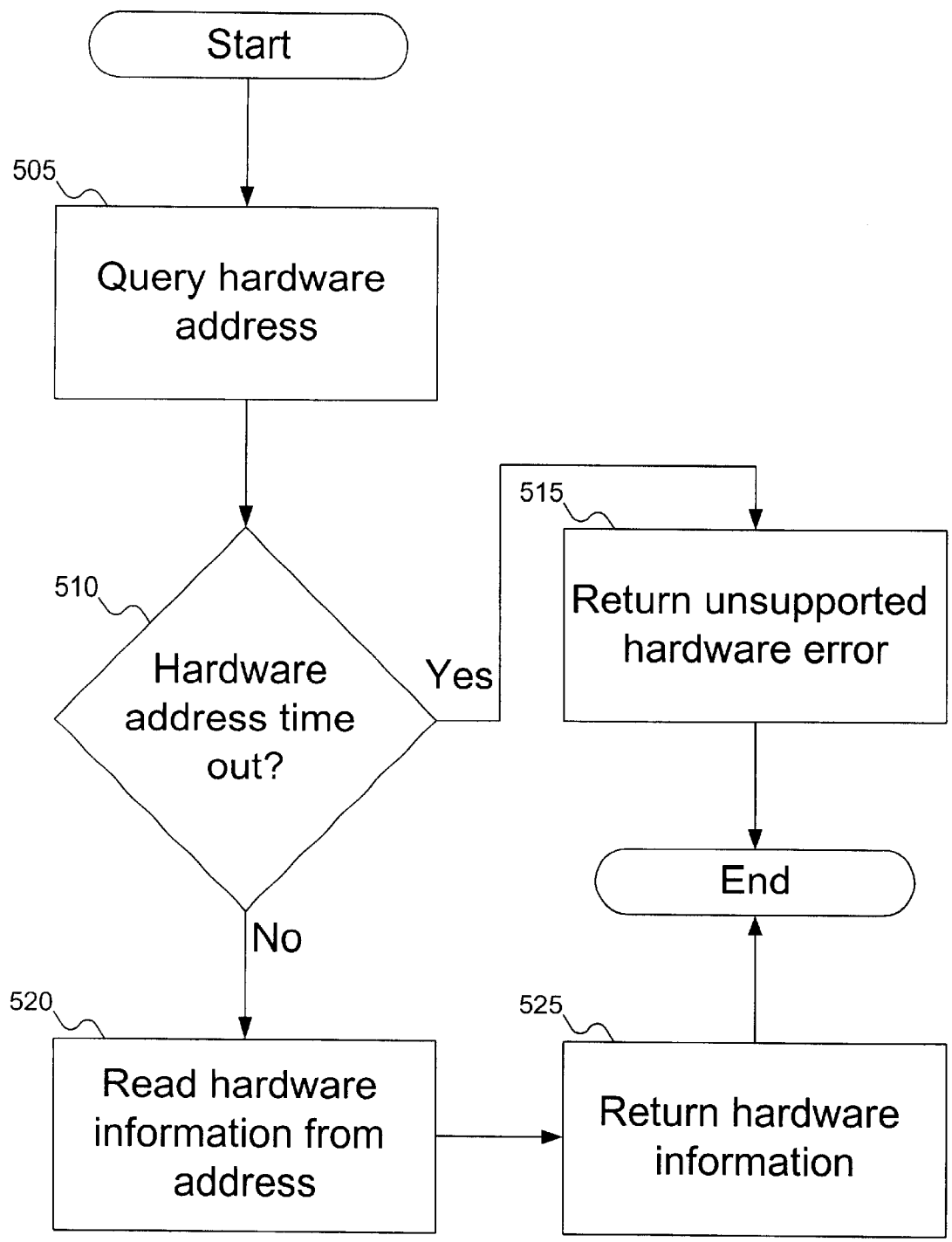
FIG. 5 is a flowchart showing how the system evaluator of the installation program of FIG. 2 checks the hardware in the computer system of FIG. 1.

FIG. 5 is a flowchart showing how the system evaluator of the installation program of FIG. 2 checks the hardware in the computer system of FIG. 1. At block 505, the system evaluator queries a hardware address for a hardware peripheral. Note that this may require querying more than one hardware address, as some peripherals can be installed at more than one address. At decision point 510, the system evaluator checks to see if the query timed out. If the query timed out, then at block 515, the system evaluator returns an unsupported hardware error. Otherwise, at block 520, the system evaluator locates and reads the hardware information from the hardware address, and at block 525 returns that information to the master installer.

Figure 6:
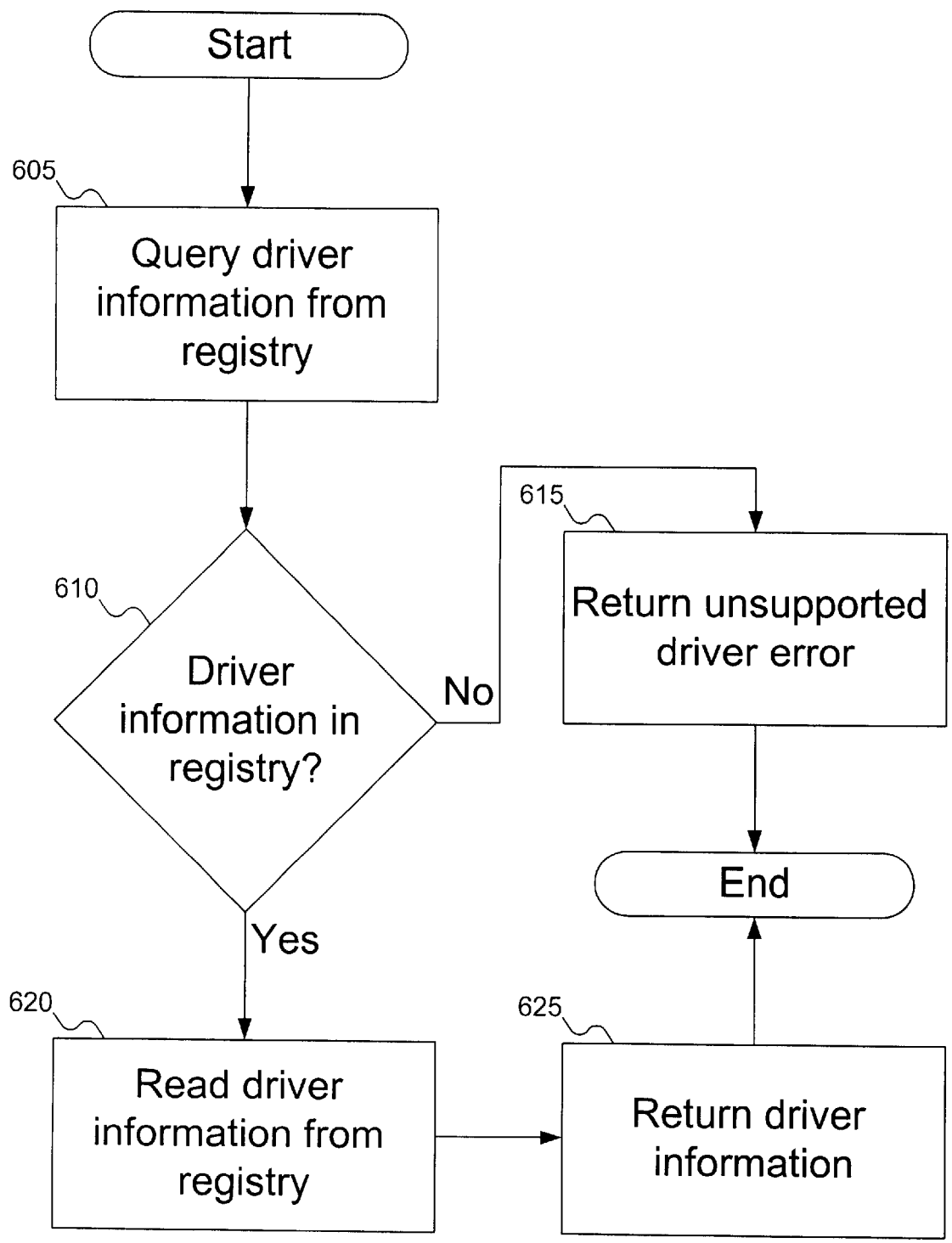
FIG. 6 is a flowchart showing how the driver evaluator of the installation program of FIG. 2 checks the installed drivers in the computer system of FIG. 1.

FIG. 6 is a flowchart showing how the driver evaluator of the installation program of FIG. 2 checks the installed drivers in the computer system of FIG. 1. At block 605, the driver evaluator queries a driver registry for information about a driver. At decision point 610, the driver evaluator checks to see if the query succeeded. If the query failed, then at block 615, the driver evaluator returns an unsupported driver error. Otherwise, at block 620, the driver evaluator locates and reads the driver information from the driver registry, and at block 625 returns that information to the master installer.

As discussed above with reference to FIG. 2, the master installer can optionally include an MBU interface, which updates the BIOS of the computer system. Although FIG. 6 is phrased in terms of drivers to support hardware and a driver registry, a person skilled in the art will recognize that the flowchart of FIG. 6 is easily adapted to determine the type and version of the installed BIOS (which can be thought of as a driver for the computer as a whole). This adaptation is accomplished by querying a data structure within the BIOS instead of the driver registry. Note that the query of the BIOS data structure should never time out, as a BIOS should always be installed in the computer system.

Figure 7:
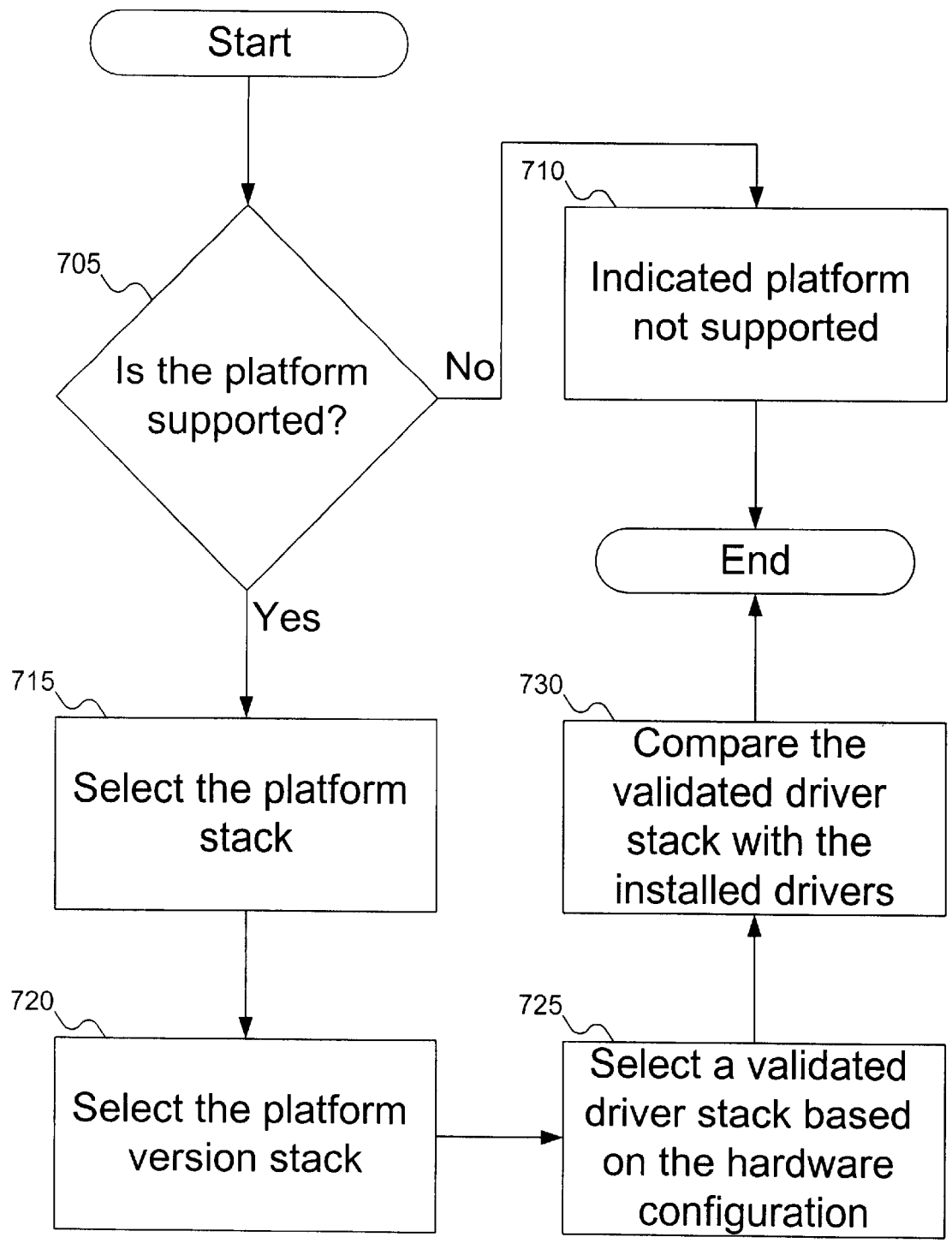
FIG. 7 is a flowchart showing how the installation program of FIG. 2 determines what drivers need to be installed or updated in the computer system of FIG. 1.

FIG. 7 is a flowchart showing how the installation program of FIG. 2 determines what drivers need to be installed or updated in the computer system of FIG. 1. At decision point 705, the master installer checks to see if the computer system platform is supported. The master installer uses the MBU interface to access the BIOS (typically stored in a data structure within the BIOS) to determine the computer system platform. The master installer then compares the information returned by the MBU interface with the valid package matrix to see if the platform is supported. For example, it could be that the computer system platform, while capable of running the installation program, is not supported by the provider of the installation program. If the computer system platform is not supported, then at block 710 the user is so informed. Otherwise, at block 715, a platform stack is selected. The platform stack helps to limit the search of the package matrix. The platform stack also allows for stacks to be architecture dependent, since a driver stack that inter-operates properly for one architecture may not necessarily inter-operate properly for another architecture. Then, at block 720, a platform version stack is selected, to further narrow the package matrix. The master installer again uses the MBU interface to determine the platform version, as described above with reference to block 705. As with the platform, different versions of the architecture may require different driver stacks. At block 725, the computer system's hardware configuration is compared with the package matrix, and a validated driver stack from the package matrix is selected. In the preferred embodiment, the package matrix is obtained from the driver source location, but a person skilled in the art will recognize that the package matrix can be obtained in other ways: for example, from a diskette or compact disc read on the computer system. The advantage of obtaining the package matrix from the driver source location is that the package matrix can be kept up-to-date with drivers at the driver source location. This helps to avoid a user from installing based on an out-of-date package matrix. Finally, at block 730, the selected validated driver stack is compared with the currently installed drivers to determine which drivers need to be installed and which need to be updated.

As discussed above with reference to FIG. 2, the master installer can optionally include an MBU interface, which updates the BIOS of the computer system. Although FIG. 7 is phrased in terms of hardware configurations and driver stacks, a person skilled in the art will recognize that the flowchart of FIG. 7 is easily adapted to identify the required updates of the installed BIOS. This adaptation is accomplished by selecting a validated driver stack based on the platform version and the installed BIOS version at block 725. Then, at block 730, the installed BIOS is compared with the selected validated stack to determine the required updates to the BIOS.

Figure 8:
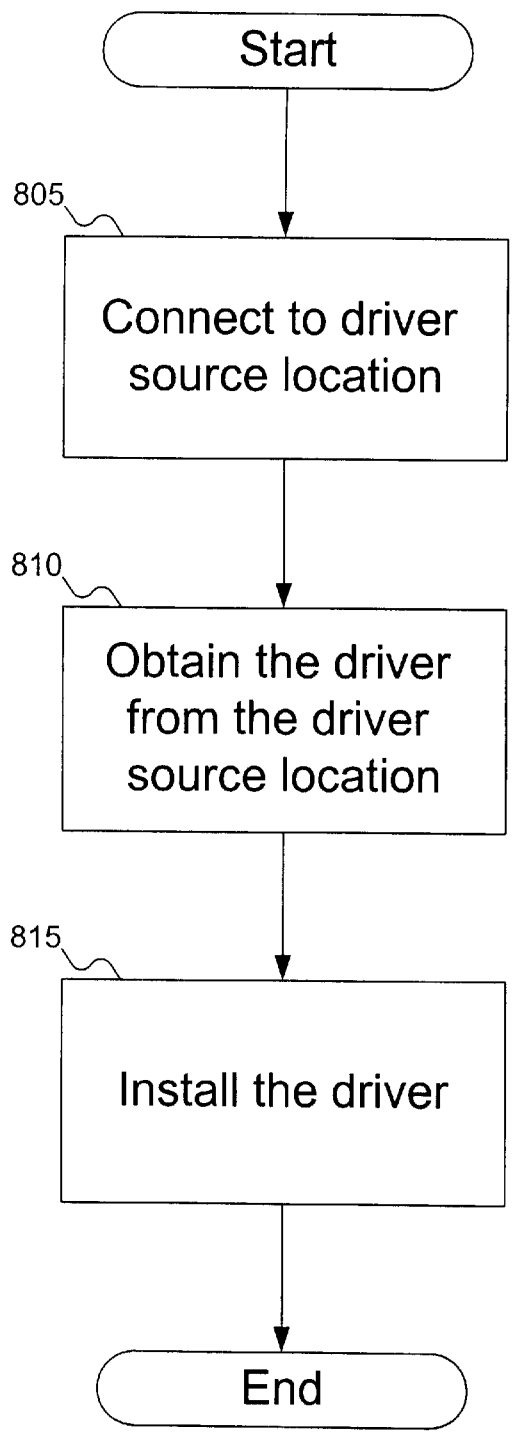
FIG. 8 is a flowchart showing how the installation program of FIG. 2 installs a new driver or updates an existing driver in the computer system of FIG. 1.

FIG. 8 is a flowchart showing how the installation program of FIG. 2 installs a new driver in the computer system of FIG. 1. At block 805, the driver installer connects to the driver source location. As discussed above, in the preferred embodiment the driver source location is accessed over a network, but a person skilled in the art will recognize that the driver source location can be elsewhere: for example, on a diskette or compact disc read on the computer system. At block 810, the drivers that need to be installed on the computer system are obtained from the driver source location. Finally, at bock 815, the needed drivers are installed on the computer system.

Although FIG. 8 is phrased in terms of installing new drivers, a person skilled in the art will recognize that FIG. 8 is easily adapted for updating an installed driver. Instead of installing a new driver, the components that require updating are retrieved from the driver source location and installed in the computer system.

Figure 9:
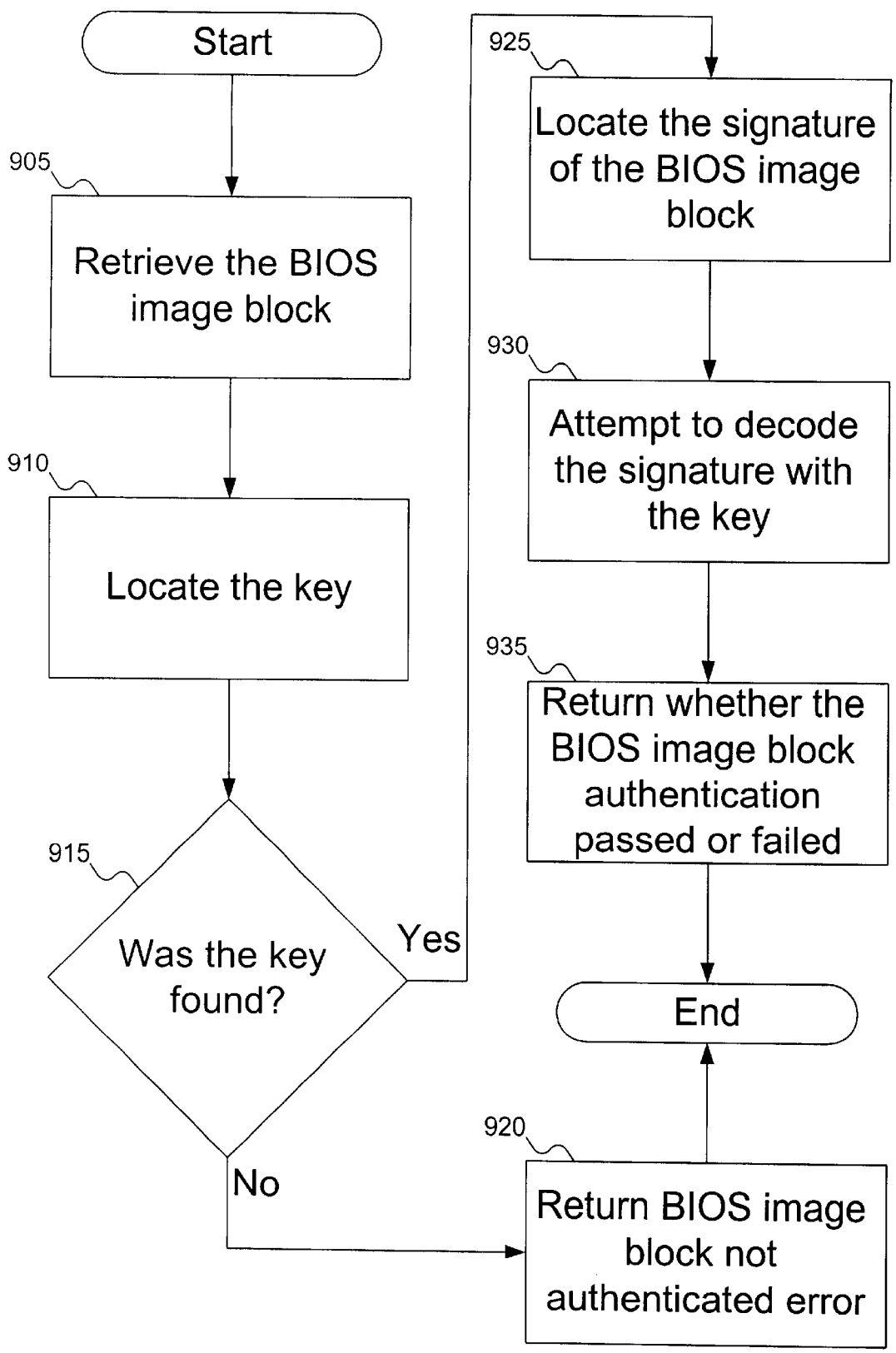
FIG. 9 is a flowchart showing how the Modular Basic Input/Output Software (BIOS) Update (MBU) interface of the installation program of FIG. 2 authenticates a BIOS image block.

FIG. 9 is a flowchart showing how the MBU interface of the installation program of FIG. 2 authenticates a BIOS image block. Authentication allows the user to be certain that the BIOS image block was issued by a trusted source, as opposed to a potential mischief maker. (In general, drivers obtained from the driver source are not authenticated, as the installation of bad drivers is generally a non-fatal error: the user can always return to the older version of the driver.) Recall that FIGS. 6 and 7 can be adapted to determine the required updates to the installed BIOS. At block 905, a BIOS image block is retrieved based on the required updates. At block 910, a key is located. In the preferred embodiment, the key is a public key of a public key infrastructure coded in the hardware of the computer system: e.g., stored in a read-only memory (ROM) chip on the motherboard of the computer. At decision point 915, the key's existence is checked. If the key could not be located, then at block 920 an error is returned indicating that the BIOS image block could not be authenticated. Otherwise, at block 925 the BIOS image block is authenticated using the key. Authentication is achieved by locating a signature attached to the BIOS image block. At block 930, the key is used to try to decode the signature. If successful, this verifies that only an authorized party could have generated the BIOS image block. In the preferred embodiment, the signature is generated by a private key that corresponds to the public key. Using a public key infrastructure as in the preferred embodiment allows for authentication without the release of the private key (releasing the private key would allow third parties to create apparently authenticated BIOS image blocks). However, a person skilled in the art will recognize that a private key infrastructure could be used, at the cost of requiring additional security for the private key. Finally, at block 935, the MBU interface returns whether or not the BIOS image block was authenticated.

Figure 10A:
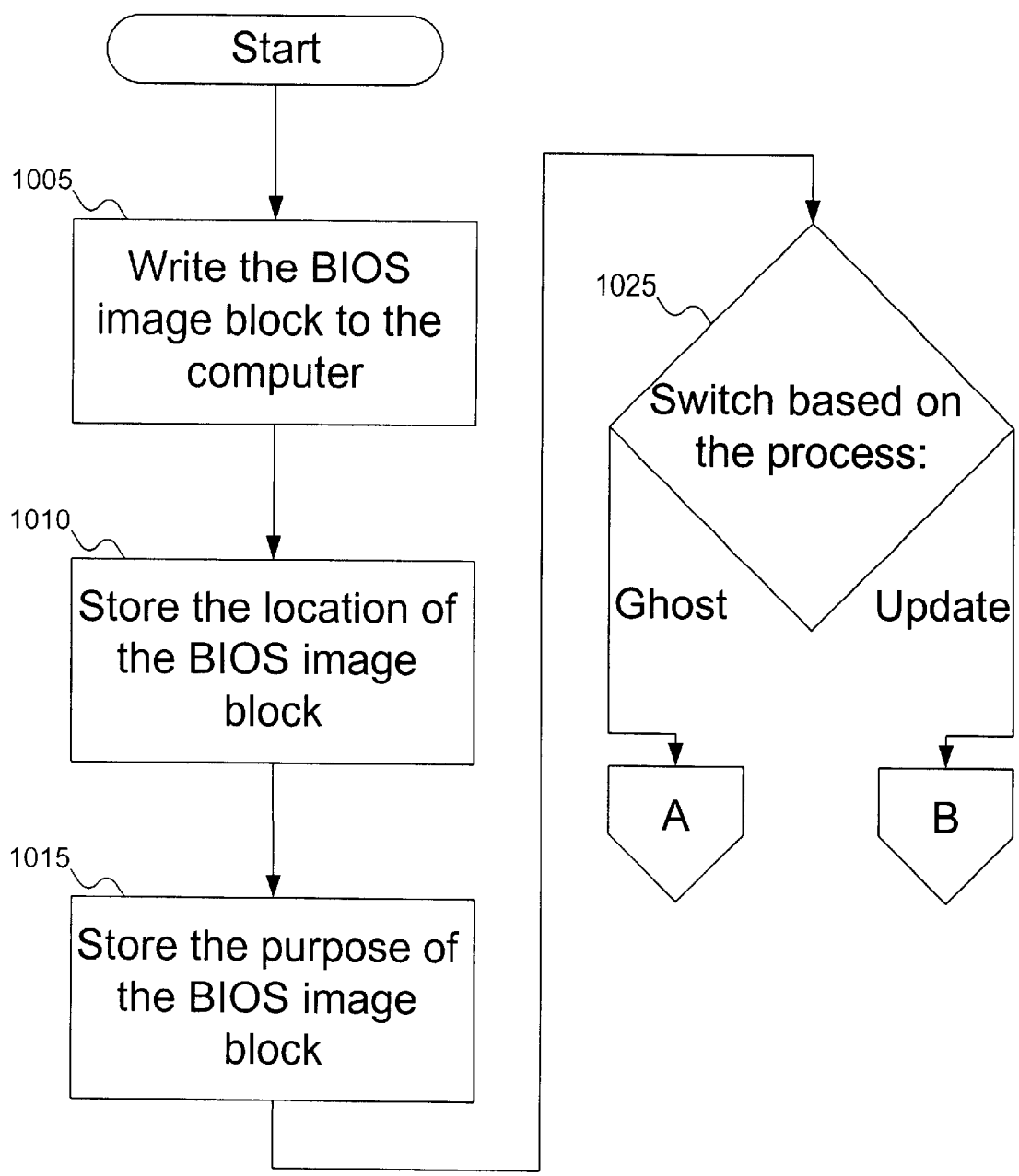
FIGS. 10A and 10B are flowcharts showing how the MBU interface of the installation program of FIG. 2 uses a BIOS image block in the computer system of FIG. 1.
Figure 10B:
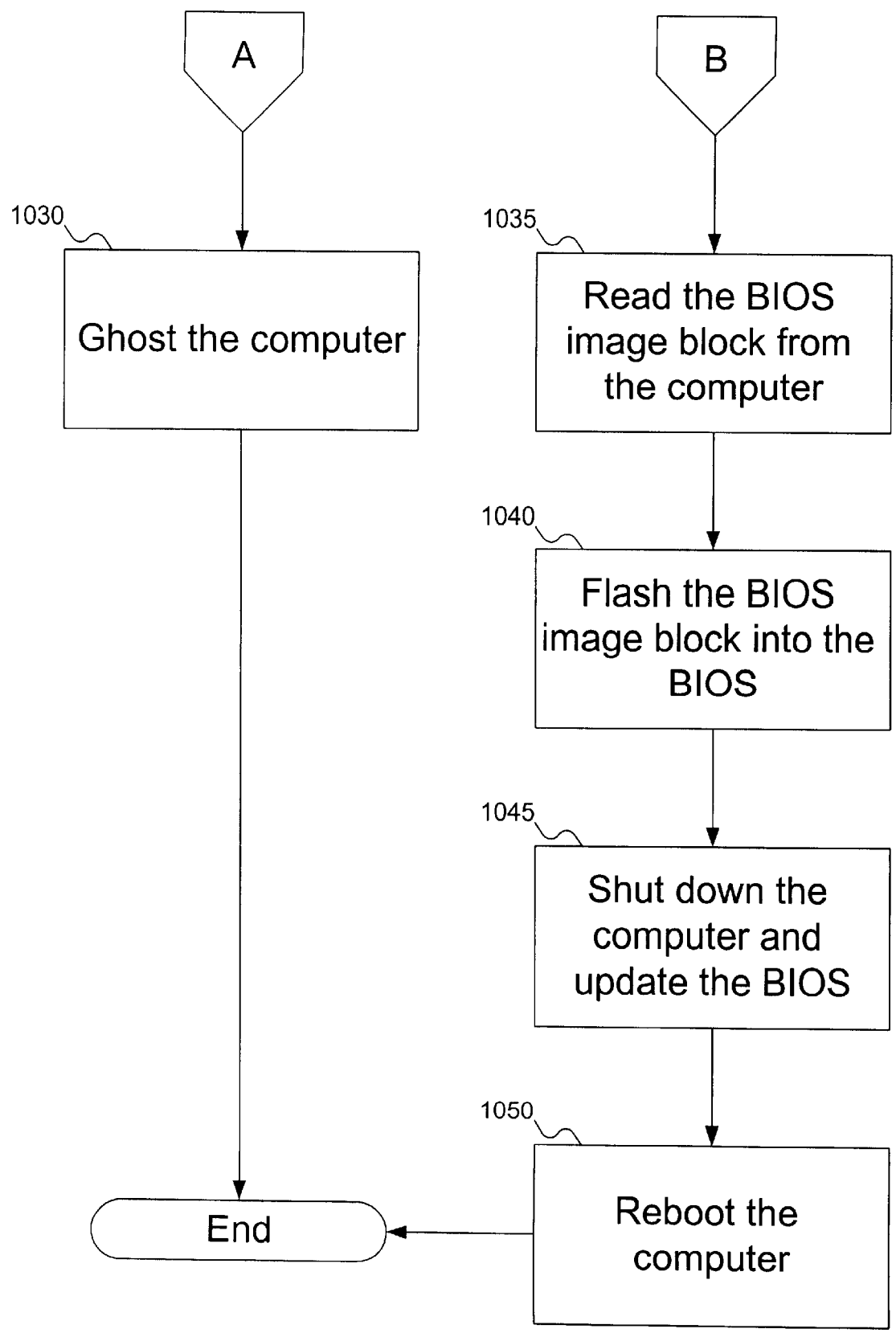

FIGS. 10A and 10B are flowcharts showing how the MBU interface of the installation program of FIG. 2 uses a BIOS image block in the computer system of FIG. 1. In FIGS. 10A and 10B, it is assumed that the BIOS image block was authenticated (i.e., issued by a trusted source). At block 1005, the (now authenticated) BIOS image block is written to the computer system. At block 1010, the location of the BIOS image block is stored for later access. At block 1015, the purpose of the BIOS image block is stored. In the preferred embodiment, there are two possible uses for the BIOS image block: for ghosting (copying the BIOS image block onto other computer systems), and for updating (on this computer system). At decision point 1025, the BIOS checks the purpose of the BIOS image block and switches based on that purpose. If the BIOS image block was written for ghosting onto other computer systems, then at block 1030 the computer (and the BIOS image block) is ghosted. Otherwise, if the BIOS image block was written for updating the BIOS, then at block 1035 the BIOS image block is read from the computer. The BIOS image block is then flashed into the BIOS of the computer at block 1040. At block 1045, the computer is shut down, at which time the BIOS sees the update installs the BIOS image block. Since the computer has been shut down, before the computer can be used, the computer will have to be rebooted at this point, as shown in block 1050.

Having illustrated and described the principles of our invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method for running an automated installation program on a computer, the method comprising:
    evaluating a hardware configuration connected to the computer, the hardware configuration including at least two devices;
    verifying that the hardware configuration is supported;
    determining a set of installed driver versions on the computer;
    comparing the set of installed driver versions with the supported hardware configuration to determine a driver to be installed;
    connecting to a driver source location; and
    installing the driver to be installed from the driver source location.

2. A method according to claim 1, wherein the method is performed periodically.

3. A method according to claim 1, wherein evaluating a hardware configuration includes querying the computer to identify a peripheral connected to the computer.

4. A method according to claim 1, wherein verifying that the hardware configuration is supported includes:
    organizing the hardware configuration into a stack; and
    comparing the stack with a set of known supported stacks.

5. A method according to claim 4, wherein verifying that the hardware configuration is supported further includes validating the stack if the stack is found in the set of known supported stacks.

6. A method according to claim 1, wherein determining a driver version set installed on the computer includes querying the computer to identify an installed driver.

7. A method according to claim 1, wherein comparing the set of installed driver versions with the supported hardware configuration includes:
    determining a set of drivers required by the supported hardware configuration;
    comparing the set of drivers required by the supported hardware configuration with the set of installed driver versions; and
    identifying at least one driver that is required by the supported hardware configuration but not in the set of installed driver versions.

8. A method according to claim 7, wherein installing the driver to be installed from the driver source location includes:
    obtaining the driver to be installed from the driver source location; and
    adding the driver to the computer.

9. A method according to claim 7, wherein identifying at least one driver that is required by the supported hardware configuration includes identifying an out-of-date driver in the set of installed driver versions.

10. A method according to claim 9, wherein:
    verifying that the hardware configuration is supported includes:
        organizing the hardware configuration into a stack;
        comparing the stack with a set of known supported stacks; and
        selecting a supported stack; and
    identifying an out-of-date driver includes identifying the out-of-date driver from the selected supported stack.

11. A method according to claim 9, wherein installing the driver to be installed from the driver source location includes:
    comparing the out-of-date driver with a current version of the out-of-date driver to determine an updated component of the current version of the out-of-date driver;
    obtaining the updated component of the current version of the out-of-date driver from the driver source location; and
    adding the updated component of the current version of the out-of-date driver to the computer.

12. A method according to claim 1, wherein connecting to a driver source location includes:
    connecting the computer to a network; and
    accessing the driver source location over the network.

13. A method according to claim 1, wherein connecting to a driver source location includes accessing a computer-readable medium directly connected to the computer as the driver source location.

14. A method according to claim 1, the method further comprising:
    determining whether a Basic Input/Output Software (BIOS) of the computer is current; and
    updating the BIOS of the computer if the BIOS of the computer is not current.

15. A method for updating a BIOS of a computer, the method comprising:
    determining whether the BIOS of the computer is current; and
    if the BIOS of the computer is not current:
        selecting a new BIOS stack for the computer from a package matrix;
        retrieving the new BIOS stack from a BIOS source location;
        authenticating the new BIOS stack; and
        updating the BIOS according to the new BIOS stack.

16. A method according to claim 15, wherein retrieving a new BIOS stack from a BIOS source location includes:
    connecting the computer to a network; and
    accessing the BIOS source location over the network.

17. A method according to claim 15, wherein retrieving a new BIOS stack from a BIOS source location includes accessing a computer-readable medium directly connected to the computer as the BIOS source location.

18. A method according to claim 15, wherein authenticating the new BIOS stack includes:
    retrieving a signature for the new BIOS stack;
    retrieving a key; and
    using the key to authenticate the new BIOS stack.

19. A method according to claim 18, wherein using the key to authenticate the new BIOS stack includes:
    decrypting the signature using the key; and
    verifying the BIOS source location from the decrypted signature.

20. A method according to claim 15, wherein updating the BIOS includes:
    flashing a BIOS update based on the new BIOS stack;
    replacing an out-of-date component of the BIOS of the computer with a current component from the new BIOS stack; and
    rebooting the computer to invoke the new BIOS.

21. A computer-readable medium containing a program for running an automated installation program on a computer, the program comprising:

evaluating software to evaluate a hardware configuration connected to the computer, the hardware configuration including at least two devices;

verification software to verify that the hardware configuration is supported;

determination software to determine a set of installed driver versions on the computer;

comparison software to compare the set of installed driver versions with the supported hardware configuration to determine a driver to be installed;

connection software to connect to a driver source location; and installation software to install the driver to be installed from the driver source location.

22. A computer-readable medium containing a program according to claim 21, wherein:

the comparison software includes:
determination software to determine a set of drivers required by the supported hardware configuration;
comparison software to compare the set of drivers required by the supported hardware configuration with the set of installed driver versions;
identification software to identify at least one driver that is required by the supported hardware configuration but not in the set of installed driver versions; and the installation software includes:
obtaining software to obtain the driver to be installed from the driver source location; and
addition software to add the driver to be installed to the computer.

23. A computer-readable medium containing a program according to claim 22, wherein:

the identification software further includes identification software to identify an out-of-date driver in the set of installed driver versions;

the obtaining software includes:
comparison software to compare the out-of-date driver with a current version of the out-of-date driver to determine an updated component of the current version of the out-of-date driver; and
obtaining software to obtain the updated component of the current version of the out-of-date driver from the driver source location; and the addition software includes addition software to add the updated component of the current version of the out-of-date driver to the computer.

24. A computer-readable medium containing a program according to claim 21, the program further comprising:

determination software to determine whether a BIOS of the computer is current; and updating software to update the BIOS of the computer if the BIOS of the computer is not current.

25. A system for running an automated installation programs on a computer, the system comprising:

a system evaluator for evaluating the computer, the computer including a hardware configuration including at least two devices;

a driver evaluator for evaluating a set of installed drivers on the computer;

a package selector for selecting a stack from a package matrix based on the hardware configuration;

a driver source containing a driver in the selected stack; and a driver installer for obtaining the driver from the driver source and for installing the driver on the computer, the driver installer responsive to the selected stack.

26. A system according to claim 25, the system further comprising a network connection coupled between the driver installer and the driver source.

27. A system according to claim 25, wherein the installation program is constructed and arranged to use the system evaluator and the driver evaluator to identify the driver.

28. A system for running an automated installation program on a computer, the system comprising:

a modular BIOS interface for determining a hardware configuration of the computer and for updating a BIOS of the computer;

a package selector for selecting a BIOS stack from a package matrix based on the hardware configuration determined by the modular BIOS interface; and a BIOS source containing the selected BIOS stack, which can be used to update the BIOS by the modular BIOS interface.

29. A system according to claim 28, wherein the modular BIOS interface determines BIOS information for the system evaluator.

30. A system according to claim 28, wherein the modular BIOS interface updates a component of the BIOS of the computer.

* * * * *

UNITED STATES PATENT AND TRADEMARK OFFICE
CERTIFICATE OF CORRECTION

PATENT NO. : 6,513,159 B1
DATED : January 28, 2003
INVENTOR(S) : Dodson, T.

It is certified that error appears in the above-identified patent and that said Letters Patent is hereby corrected as shown below:

<u>Column 10,</u>
Line 9, "programs" should read -- program --.

Signed and Sealed this

Eighth Day of June, 2004

JON W. DUDAS
*Acting Director of the United States Patent and Trademark Office*